Aug. 7, 1962 D. D. BRYANT 3,048,410
SNAP-ON DUSTGUARD OIL SEALS
Filed Jan. 20, 1959 2 Sheets-Sheet 1

INVENTOR
Donald D. Bryant
BY Alexander Dowell
ATTORNEYS

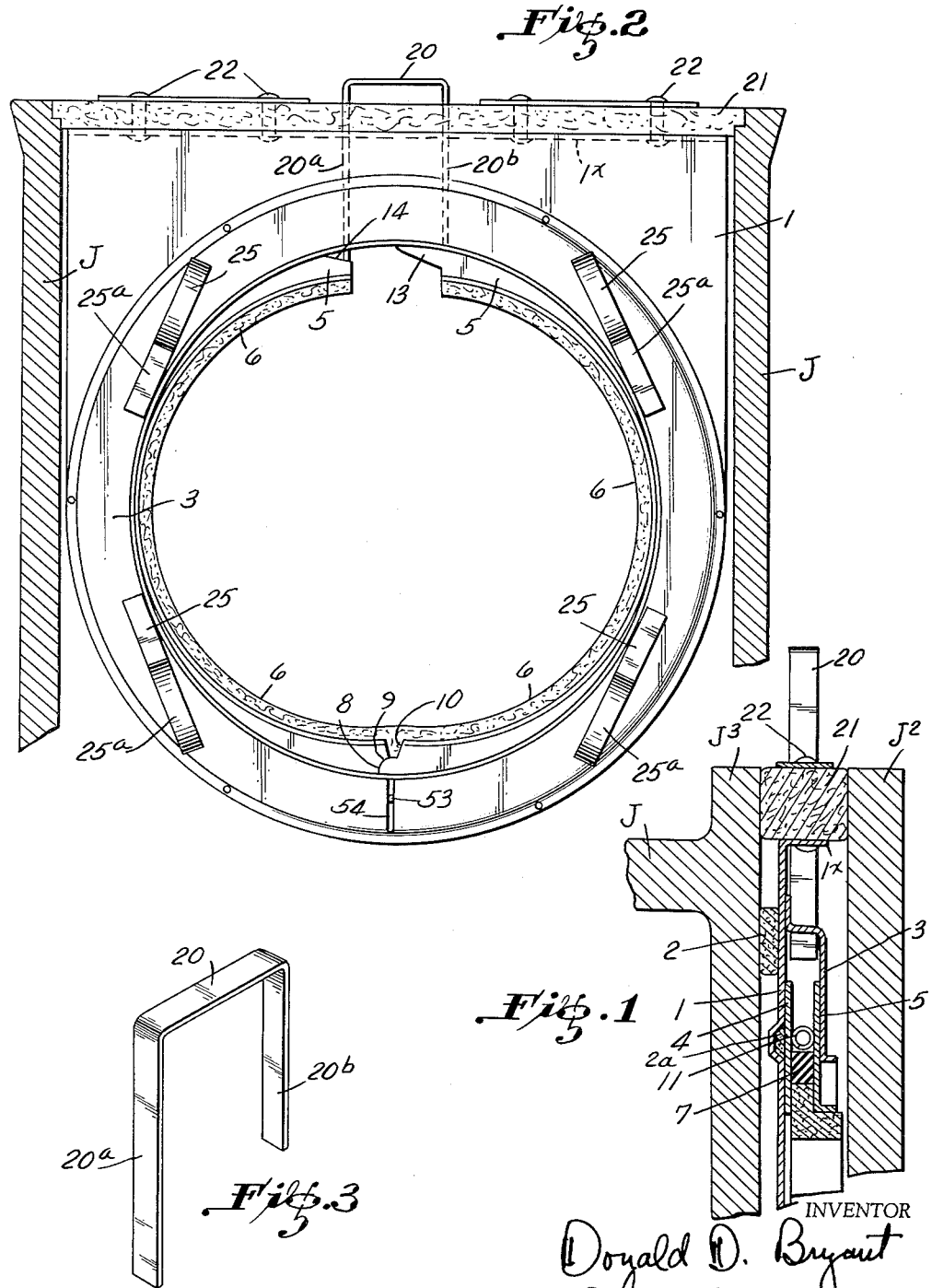

3,048,410
SNAP-ON DUSTGUARD OIL SEALS
Donald D. Bryant, 1960 Military Road,
Huntington, W. Va.
Filed Jan. 20, 1959, Ser. No. 787,868
1 Claim. (Cl. 277—10)

This invention is a novel improvement in snap-on dustguards and oil seals, for journal boxes of railroad cars or the like, and the principal object thereof is to provide a snap-on dustguard and oil seal for such journal boxes having means for initially holding the dustguard band within the recess of the journal box expanded, while the journal portion of the axle is being inserted through the dustguard band into the journal box, said band having yieldable contracting means thereon operable therewith and maintained inoperative while the dustguard is expanded, and said dustguard having yieldable means thereon normally urging the dustguard against one face of the recess in the journal box, to prevent leakage of oil along the journal portion of the axle into the recess of the journal box between the dustguard and the said one face of said recess.

Another object of the invention is to provide a closure on said dustguard for the open top of the recess of the journal box to seal same against passage of dust, water or sleet into said recess, and the lubricant carried thereby.

Other objects of the invention are to provide, means to lock a snap-on sealing band open for journal application or clearance; also means to snap on an oil seal band around the axle journal in a dustguard recess of a journal box; also means to self-adjust an oil seal band around the axle journal; also means to allow an oil seal band to float with the axle journal movement; also means to seal an oil seal band surface against the stationary rack surface of a journal box; also means to extend the axle contact surface of the oil seal band closer to the wheel so that the seal will remain on the axle section during lateral motion of axle and wheels; also means to secure a pliable, flexible, self-adjusting oil seal band in a locked (open and closed) section of a slidable retaining band; also means to close the retaining band so as to seal both the band journal contact surface and the band slidable side surface against loss of oil; also means to allow the oil band to flex with shock on lateral action of the journal; also means to seal a journal box cavity from loss of oil when car is dumped; and also means to freely enter an oil seal into the dustguard section of a journal box casting, and then means to expand the seal so it will seal the box against loss of oil when the car is in transit or being dumped.

I will explain the invention with reference to the accompanying drawings, which illustrate several practical embodiments thereof, in order to enable others familiar with the art to adopt and use the same; and will summarize in the claim the novel features of construction, and novel combination of parts, for which protection is desired.

In said drawings:

FIG. 1 is a longitudinal section through a journal box of typical form, showing the open recess for the dustguard inserted into said open recess;

FIG. 2 is an enlarged plan view showing the parts of the dustguard band maintained in open position in said recess prior to insertion therethrough of the journal portion of the axle;

FIG. 3 is a perspective view of the means for maintaining the ends of the dustguard band in open position;

Figure 6:
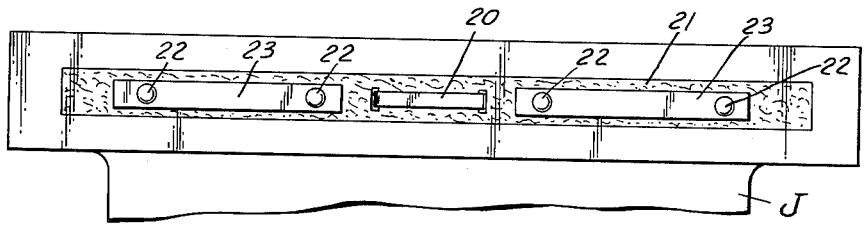
FIG. 6 is a top plan view of the parts shown in FIG. 4.

As shown in the drawings, my novel snap-on dustguard and oil seal is adapted to be mounted in the dustguard recess of a standard journal box (FIG. 1), the axle having a journal portion and a wheel, which journal box may be equipped with the usual cover plate at its outer end, and having at its inner end a dustguard recess bounded by the rear plate J2 and by a spaced parallel inner plate J3, said plates J2 and J3 having coaxial circular openings therein which are of greater diameter than the journal portion of the axle in order that the axle journal portion may be inserted into the journal box J through the openings in plates J2 and J3 into normal position within the journal box, the particular means or method of mounting the axle portion within the journal box J forming no part of my present invention. As shown in FIG. 1, the top of the journal box between the plates J2 and J3 is open, in the usual manner, in order that a dustguard and/or oil seal may be inserted downwardly therein to surround the axle in order to prevent the oil or other lubricant within journal box J from escaping along the journal between the journal box J and the axle wheel.

As shown, my novel snap-on dustguard and oil seal comprises a face plate 1 of the same general shape but slightly smaller than the dustguard recess in journal box J, said face plate 1 being insertable down into the recess in journal box J, and having on its face for contact with the wall J3 of the journal box recess a gasket 2 adapted to surround the opening in wall J3 for the axle, gasket 2 preventing leakage of oil from journal box J radially of wall J3, when the plate is inserted in the dustguard recess of the journal box.

Figures 4, 5:
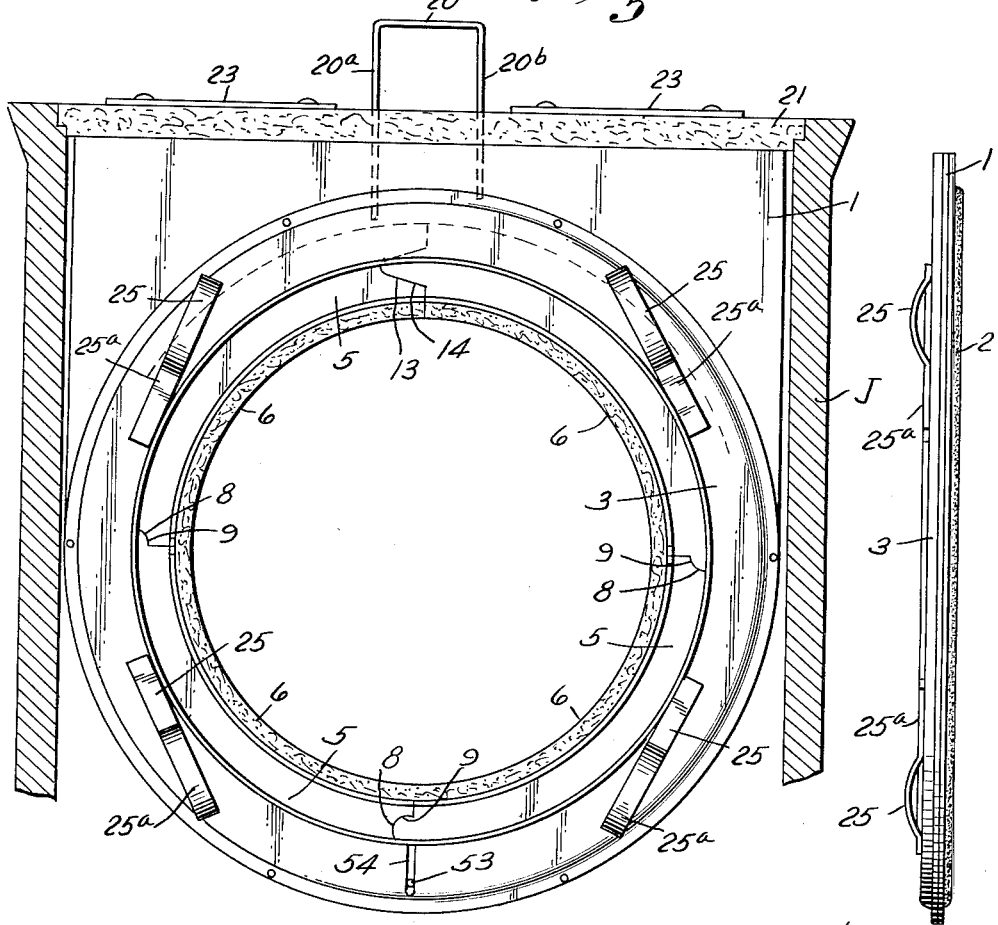
FIG. 4 is a view similar to FIG. 2 but showing the parts in position wherein the dustguard band is contracted around the journal portion of the axle.
FIG. 5 is a side elevation of the dustguard parts, shown in FIG. 4.

Between face plate 1 and a substantial circular cover plate 3 is a floating band which is preferably formed in sections, four such sections being shown in FIG. 4, each section comprising parallel arcuate plates 4 and 5, FIG. 1, which are secured together in spaced relation by similarly arcuate fillers 7, FIG. 1, the plates 4 and 5 carrying on their inner faces shoes 6, FIG. 1, of resilient material to engage the journal portion of axle, the inner ends of the shoes bearing upon the fillers 7 so that the shoes 6 will be normally urged against the journal portion of the axis when the parts are in normal position.

The plates 4 and 5 make a sliding fit between the face plate 1 and cover plate 3 so that the sections confined between the plates 1 and 3 may shift relatively to the plates 1 and 3 to accommodate movements of the axle within the journal box J while maintaining an effective oil seal between the plates 4—5 of the sections and frames 1—3.

The device as now described should be fully effective as a dust seal, and should be equally effective as a water and sleet seal. As an oil seal, it is equally effective provided the oil level in the journal box is not carried higher than the level permitted in the present journal-box design.

As shown in FIGS. 2 and 4, three of the sections of the floating band carry parti-circular heads 8 adapted to engage parti-circular recesses 9 in the adjacent band sections, the shoulders between the adjacent sections being cut away as at 10 (FIG. 2) so that the band sections may be permitted to enlarge beyond the diameter of the section of the axle, for the purpose hereinafter described.

The outer peripheries of the band sections are grooved to receive an endless tension spring 11 (FIG. 1), whereby the sections will normally be contracted by the spring 11 around the axle section, the ends of the spring 11 being connected together whereby the sections of the floating band will be normally yieldably contracted around the axle section.

In way of the split, one band section is provided with a tongue 13 (FIG. 2), adapted to fit within a correspondingly shaped recess 14 on the adjacent band, thus permitting the sections to separate, but when the sections are contracted the same will form a circular band around the axle section. Diametrically opposite the parts 13 and 14 on one section is a pin 53 slidably engaging a radial slot 54 in cover plate 3 to prevent rotational movement of the band sections 4—5 with respect to the face plate 4 and cover plate 3.

The periphery of cover plate 3 may be welded or otherwise secured to face plate 1, with the floating band 4—5 inserted therebetween, the floating band 4—5 being capable of orientation about the axes of the plates 1 and 3, so that the axle, when the vehicle is moving, may orient freely with respect to the axes of the openings in the openings in the journal box J through the dustguard recess, while the floating band is contracted around the axle portion.

While the axle portion is being inserted through the dustguard and through the openings in the recess of the journal box J, it is of course necessary that the floating band 4—5 be maintained in expanded position to permit entry of the axle section therethrough, while the dustguard is positioned in the recess in the journal box.

In order to maintain the dustguard band in expanded position, a U-shaped member 20 is provided adapted to be inserted downwardly through the open top of the recess in the journal box J for the dustguard, said member 20 having one leg 20a which when the member 20 is depressed is adapted to engage the end of the adjacent segment 4—5 of the dustguard band, as shown more particularly in FIG. 2, and having another leg 20b adapted to engage the end of the adjacent segment of the dustguard band, as shown more particularly in FIG. 2, to thereby hold the adjacent end of the dustguard sectors open, as shown in FIG. 2, whereby the dustguard band will be maintained in expanded or open position sufficiently to permit the axle of the wheel to be readily inserted into the journal box J through the expanded dustguard, but when the member 20 is pulled upwardly, as shown in FIG. 4, the adjacent ends 13—14 of the adjacent segments of the dustguard will be released, permitting them to come together as shown in FIG. 4, to completely surround the axle within the journal box J.

In order to close the open top of the recess in the journal box to prevent entry of dirt, dust or sleet into the journal box, I preferably extend the plate 1 sufficiently upwardly so that the same may be flanged as at 1x (FIG. 1) to extend across but below the open top of the recess in the journal box, the flange portion 1x forming a surface to which may be attached a strip of spongy material 21 secured thereto by rivets 22, the spongy material 21 being of sufficient area and shape to completely fill the open top of the recess in the journal box J when the dustguard unit is inserted into the recess in the journal box between the walls J2 and J3. The spongy material may be of neoprene or other similar material to seal the opening in the journal box against ingress of dust, water or sleet. Obviously the material 21 would be provided with openings therethrough for the legs 20a and 20b of the clip 20 to permit the legs of the clip to be inserted therethrough to hold the sections of the dustguard band open, or to be pulled upwardly to permit the ends of the dustguard sections to completely surround the axle. If desired, in order to hold the member 21 in proper position upon the flange 1x I preferably provide strips 23 which are secured to the flange 1x by means of the rivets 22 which pass through the strips 23 and through the flange 1x, as clearly shown in FIGS. 1, 2 and 4. Instead of utilizing neoprene for the strip 21 the same may be formed of spongy rubber or any other material which will close the top of the dustguard recess to seal the journal box against ingress of dust, water and sleet.

As previously stated, the front face 1 of the dustguard seal carries a gasket 2 adapted to normally yieldably seat against the wall J3 of the recess of the journal box J. In order to yieldably maintain the gasket 2 in contact with wall J3 I provide a plurality of bowed springs 25 which have one end 25a permanently fixed to the face of the cover plate 3 by rivets or welding or the like, so that when the dustguard band is inserted downwardly into the recess in the journal box between the walls J2 and J3 the springs 25 will normally urge the gasket 2 carried by the front face 1 into contact with the wall J3 of the journal box recess to prevent oil within the journal box from passing along the axle into the recess defined by the walls J2 and J3 and passing upwardly between front plate 1 and the gasket 2, which oil would normally be dissipated from the recess along the axle and would thus be lost from the journal box itself.

Thus, according to my invention, when it is desired to insert the dustguard shown in the drawings into the journal box J the dustguard should be inserted into the recess in the journal box between the walls J2 and J3 and the split ends thereof held apart by depressing the clip 20 so as to engage the opposed ends of the split in the dustguard band, thus maintaining the dustguard band expanded while the axle is inserted through the rear end of the journal box and through the dustguard band. During this time, the springs 25 will maintain the gasket 2 carried by the front plate 1 in contact with the wall J3 of the journal box and when the clip 20 is pulled upwardly to disengage the split ends of the journal box, after the axle has been inserted into the journal box, and through the dustguard band, the springs 25 will still maintain the gasket 2 carried by the front plate 1 into contact with the wall J3 of the journal box, and at the same time the member 21 carried by the front plate 1 will close the open top of the recess in the journal box J, thus preventing dust, water or sleet from entering the journal box J through the recess in the journal box.

I do not limit my invention to the exact form shown in the drawings, for obviously changes may be made therein within the scope of the claim.

I claim:

A dustguard unit comprising a front plate, a cover plate secured thereto in parallel spaced relation; a split dustguard band making a sliding fit between said front and cover plates; means for yieldably contracting the band; said front plate having on its exterior face a gasket; means adapted in one position to hold the split end of the band apart; other means for pressing the gasket carrying face of the front plate whereby when the said first means is shifted into another position the split end of the band will be contracted, while the other means will shift the said gasket; said dustguard band being formed of sections allel relation, each section carrying on its inner face a comprising spaced arcuate plates secured together in parresilient shoe means except at the split for articulating the sections together; and said contracting means comprising an endless resilient member under tension disposed around the said sections for normally contracting the band; a pin on the section opposite the split engaging a radial slot in the cover plate for preventing rotation of the band within the front and cover plates while permitting limited vertical and lateral movements thereof.

References Cited in the file of this patent
UNITED STATES PATENTS

| | | |
|---|---|---|
| 2,152,937 | Vigne et al. | Apr. 4, 1939 |
| 2,251,195 | Meunier | July 29, 1941 |
| 2,257,119 | Johannesen | Sept. 30, 1941 |
| 2,638,363 | Bryant | May 12, 1953 |
| 2,840,396 | Hennessy | June 24, 1958 |